(12) United States Patent
Firtion et al.

(10) Patent No.: US 7,252,075 B2
(45) Date of Patent: Aug. 7, 2007

(54) MOTOR VEHICLE FUEL TANK

(75) Inventors: Eric Firtion, Villers sur Coudun (FR); Patrice Baudoux, Flavy le Martel (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 260 days.

(21) Appl. No.: 10/432,014

(22) PCT Filed: Nov. 20, 2001

(86) PCT No.: PCT/EP01/13533

§ 371 (c)(1),
(2), (4) Date: Sep. 2, 2003

(87) PCT Pub. No.: WO02/40302

PCT Pub. Date: May 23, 2002

(65) Prior Publication Data

US 2004/0045962 A1 Mar. 11, 2004

(30) Foreign Application Priority Data

Nov. 20, 2000 (FR) .................................. 00 14947

(51) Int. Cl.
*F02M 37/04* (2006.01)
(52) U.S. Cl. ........................................ 123/509; 123/514
(58) Field of Classification Search ................ 123/509, 123/514, 456, 510; 417/76, 77, 79
See application file for complete search history.

(56) References Cited

U.S. PATENT DOCUMENTS

| | | | |
|---|---|---|---|
| 2,953,156 A | 9/1960 | Bryant | |
| 4,077,884 A | 3/1978 | Naumann | |
| 4,212,600 A | 7/1980 | Otto et al. | |
| 4,306,844 A | 12/1981 | Otto et al. | |
| 5,263,458 A * | 11/1993 | Fujino et al. | 123/514 |
| 5,794,597 A * | 8/1998 | Schwegler et al. | 123/514 |
| 6,109,299 A * | 8/2000 | Hashimoto et al. | 137/574 |
| 6,123,511 A * | 9/2000 | Sertier | 417/87 |
| 6,260,542 B1 * | 7/2001 | Kochsmeier et al. | 123/509 |
| 6,505,644 B2 * | 1/2003 | Coha et al. | 137/565.22 |
| 6,679,226 B2 * | 1/2004 | Burke et al. | 123/509 |
| 6,739,319 B2 * | 5/2004 | Braun et al. | 123/509 |
| 6,802,301 B2 * | 10/2004 | Fauser et al. | 123/509 |
| 6,832,627 B2 * | 12/2004 | Braun et al. | 137/565.22 |
| 6,942,787 B2 * | 9/2005 | Robinson et al. | 210/97 |
| 2002/0043253 A1 * | 4/2002 | Begley et al. | 123/497 |

FOREIGN PATENT DOCUMENTS

DE    35 00 718    7/1986

(Continued)

*Primary Examiner*—Carl S. Miller
(74) *Attorney, Agent, or Firm*—Stites & Harbison PLLC; Douglas E. Jackson

(57) ABSTRACT

The invention concerns a motor vehicle fuel tank (1) comprising a fuel reserve chamber (4) further comprising a suction device supplied with fuel coming directly from a fuel filter and adapted to suck up fuel in at least a low suction point outside the chamber (4), and in delivering it into the chamber (4) at least in a high delivery point, located above the desired minimum level of fuel in the tank (4) and higher than the low suction point.

10 Claims, 9 Drawing Sheets

FOREIGN PATENT DOCUMENTS

Figure 1:
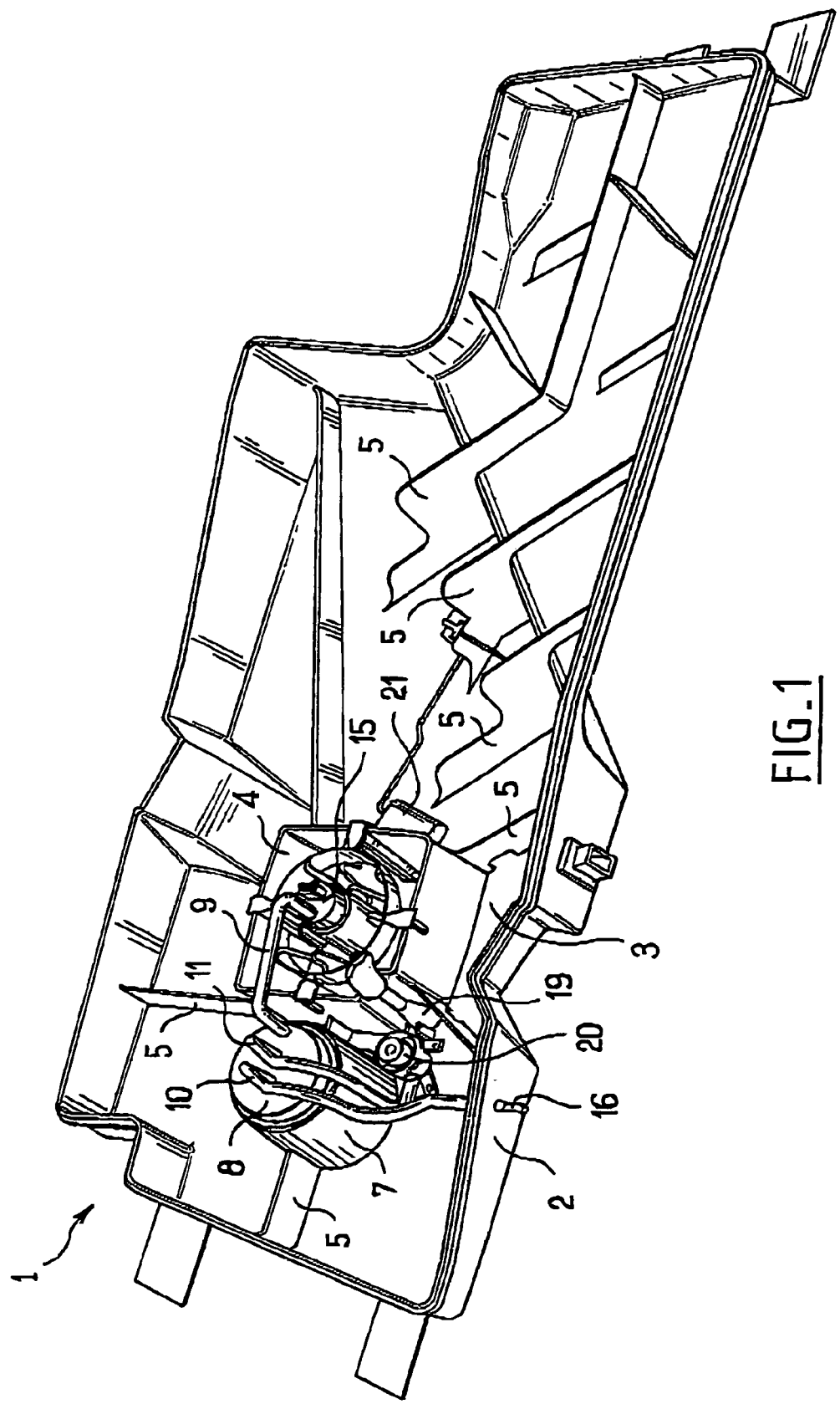

| | | |
|---|---|---|
| DE | 36 12 194 | 10/1986 |
| DE | 41 23 367 | 1/1993 |
| DE | 43 35 858 | 4/1995 |
| DE | 44 33 301 | 3/1996 |
| DE | 196 27 578 | 1/1998 |
| EP | 0 864 458 | 12/1997 |
| FR | 2 391 935 | 12/1978 |
| FR | 2 768 667 | 3/1999 |
| FR | 2 778 948 | 11/1999 |

* cited by examiner

FIG_5

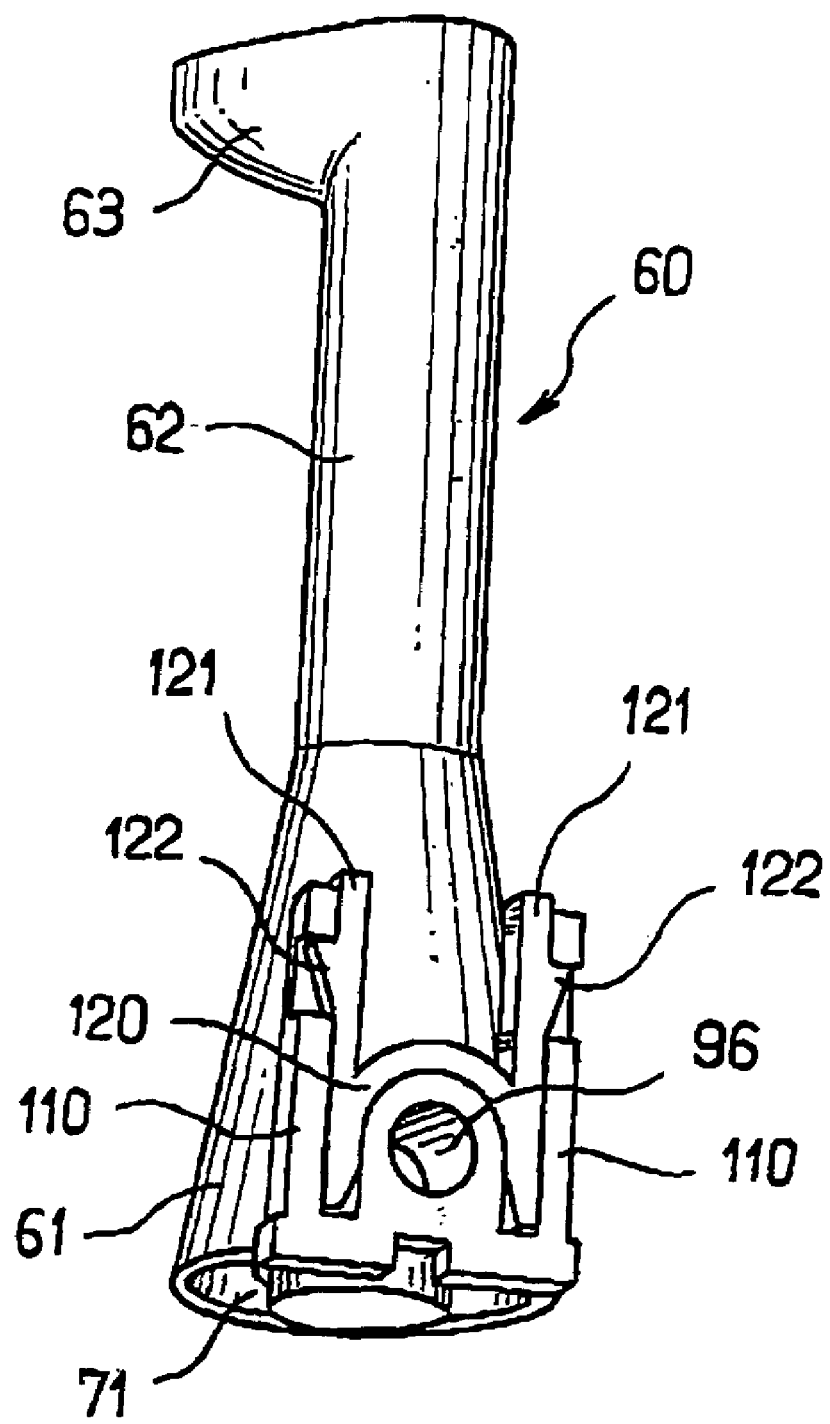
FIG_7

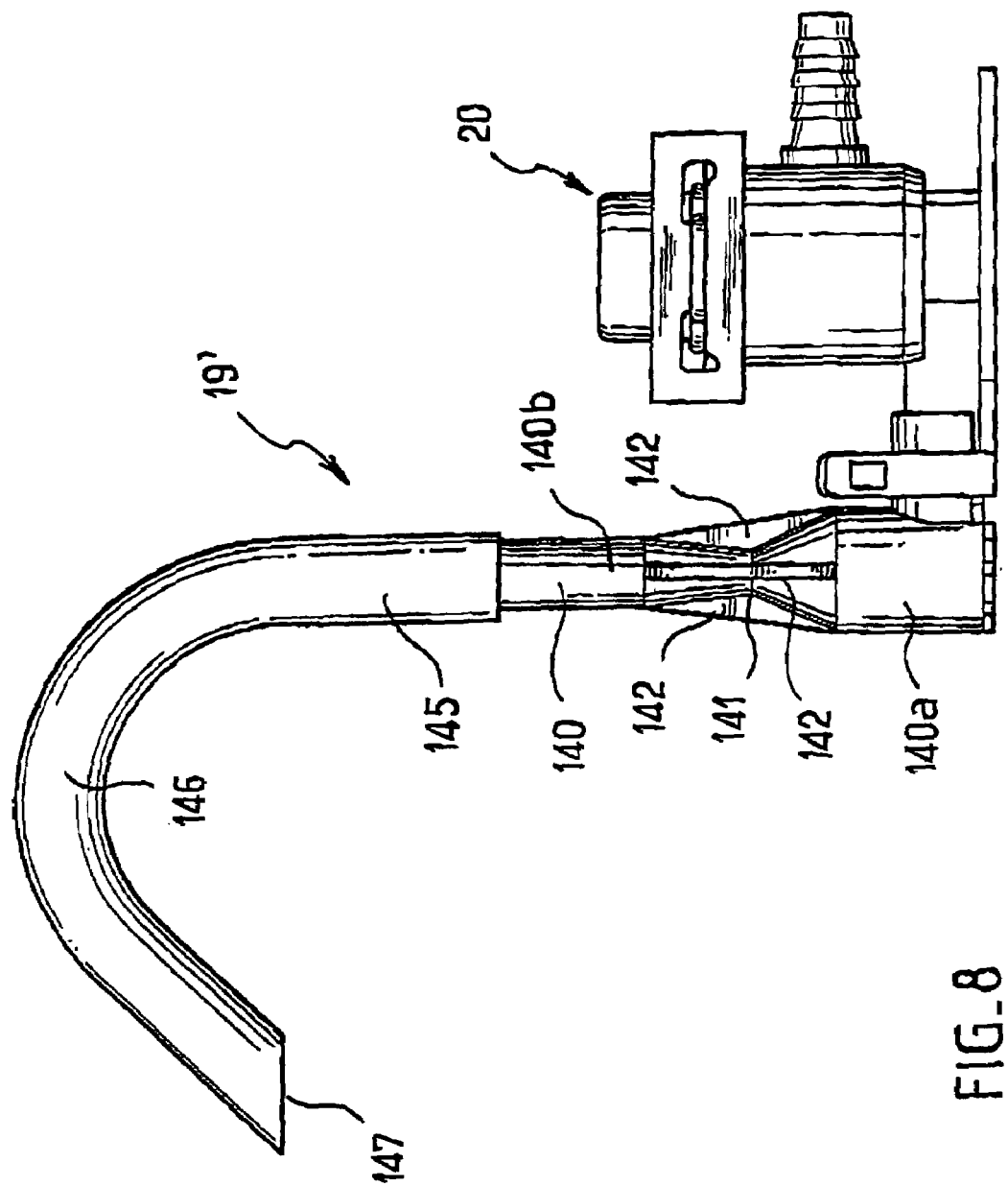
FIG_8

MOTOR VEHICLE FUEL TANK

The present invention relates to a motor-vehicle fuel reservoir comprising a reserve container.

A reserve container of this kind is also called a calming container or retention container and enables a reserve of fuel to be formed to feed the fuel pump.

French Patent Application FR-A-2 768 667 has disclosed a motor-vehicle fuel reservoir comprising a reserve container. The latter is fed with fuel by means of a jet pump comprising an ejection nozzle, which delivers a jet of fuel through an opening in its wall. The latter is fitted with a valve, which allows the emptying of the container to be limited when the jet pump is not working.

French Patent Application FR-A-2 778 948 describes a fuel reservoir comprising a reserve container and a jet pump inside the container. The base of the reserve container has an opening fitted with a valve.

French Patent Application FR-A-2 391 935 describes a fuel reservoir comprising a conduit for recycling excess fuel opening into a reserve container. The latter is provided with valves intended to open during cornering in such a way as to allow an additional supply of fuel.

In these known reservoirs, the presence of valves makes them more complex to manufacture and can give rise to problems with reliability and untimely emptying of the container. Moreover, the valves do not have the desired leaktightness.

Thus after the vehicle has been parked for a prolonged period on a slope and with a small amount of fuel in the reservoir, the container tends to empty through the opening fitted with the valve, which can result in the fuel pump being drained.

The present invention aims in particular to simplify the manufacture of fuel reservoirs and to improve their reliability.

It achieves this by virtue of the fact that, in addition to the reserve container, the motor-vehicle fuel reservoir includes a suction device supplied with fuel coming directly from a fuel filter and capable of sucking in fuel at at least one low suction point outside the reserve container and delivering it to the reserve container at at least one high delivery point situated above a desired minimum level of fuel in the reserve container and higher than the low suction point.

The invention allows the production of a reserve container, the bottom of which is leaktight since it is not necessary to fit it with one or more valves.

In a particular embodiment, the reserve container includes a volume opening at the top via an opening into the reservoir and the suction device is capable of delivering the fuel into the reserve container via this opening.

The suction device is advantageously a jet pump.

The delivery rate of such a jet pump is preferably chosen in such a way that the quantity of fuel delivered by this jet pump compensates for the quantity removed, that consumed by the fuel pump, and guarantees a minimum level of fuel in the reserve container in order to ensure that the fuel pump is not drained.

In a preferred embodiment of the invention, the jet pump includes a substantially vertical suction duct, preferably extending substantially over the full height of the reserve container.

The jet pump then includes an ejection nozzle, which can be substantially frustoconical and is capable of ejecting the fuel into the suction duct so as to create there, by a Venturi effect, a reduced pressure at the base of the duct, which enables fuel contained in the reservoir outside the reserve container to be sucked in.

In its lower part, the suction duct preferably includes a base, which can be substantially frustoconical and, with the ejection nozzle, defines a passage in which the fuel sucked in can flow.

The base of the suction duct advantageously includes a lateral opening allowing the passage of a feed conduit of the ejection nozzle.

The suction duct is preferably produced in the form of an added piece fixed in the reservoir after the placement of the ejection nozzle.

In another preferred embodiment, the suction duct includes a substantially semi-cylindrical lateral extension, which assumes a position in which it overlaps the feed conduit of the ejection nozzle.

A lateral extension of this kind makes it possible to improve the retention and positioning of the suction duct on the ejection nozzle.

In a particular embodiment, the suction duct includes, at its upper end, a nose forming a spout arranged to allow the fuel flowing within the nose to pour into the reserve container.

A nose of this kind forming a spout is particularly useful when the jet pump is delivering a low fuel flow rate since this fuel can then flow along the nose and pour into the reserve container.

The nose forming a spout preferably passes over the wall of the reserve container.

In another particular embodiment, the suction duct includes an elbow in its upper part.

The suction duct can have a constriction, situated substantially half-way up the duct for example.

The suction duct advantageously includes stiffening ribs at the level of the said constriction.

At its upper end, the suction duct can be connected to a tube to allow fuel flowing in the suction duct to pour into the reserve container.

Such a tube advantageously forms an elbow arranged in such a way as to direct the fuel emerging from the tube into the reserve container.

This tube makes it possible to dispense with a nose forming a spout such as that mentioned above.

The jet pump is preferably fed via a pressure regulator.

This pressure regulator is advantageously mounted on a support fixed to the bottom wall of the reservoir.

This support can, for example, include fixing tabs provided with holes, in which studs produced in one piece with the bottom wall of the reservoir are upset.

The ejection nozzle is preferably produced in one piece with the support.

The substantially semi-cylindrical lateral extension of the suction duct also preferably supports at least one first fixing member capable of cooperating, preferably by latching, with a second fixing member belonging to the support of the pressure regulator.

The suction duct can thus easily be put in place in the reservoir after the fixing of the support of the pressure regulator.

This simplifies the assembly of the various elements of the reservoir.

In a particular embodiment, the support of the pressure regulator includes a tubular body provided with lateral slots which allow a clip for retaining the pressure regulator on its support to be engaged transversely to the axis of the said body.

In a particular embodiment, the reservoir includes a fuel pump, which is held suspended within the reserve container by a retention member capable of attenuating the transmission of the vibrations from the fuel pump to the reservoir.

In a preferred embodiment, this retention member rests on an upper part of the reserve container.

The retention member can thus be put in place easily in the reservoir by being placed on the reserve container.

The retention member preferably includes:
a fixing ring provided with fixing arms resting on the reserve container,
a supporting skirt which receives the fuel pump and
elastically deformable branches connecting the supporting skirt to the fixing ring.

The retention member is preferably produced by moulding plastic material in one piece.

The fixing arms are preferably shaped so as to be fixed by latching onto the reserve container.

The fixing of the retention member is thus easy.

In a particular embodiment, each of the fixing arms includes an upper part substantially perpendicular to the axis of the fixing ring and connected to the ring in the vicinity of its upper section, and a lower part including, on the one hand, an upright substantially parallel to the axis of the fixing ring and connected to the latter and, on the other hand, a locking tab forming, with the abovementioned upright, a throat in which the wall of the reserve container engages, the height of this throat preferably being substantially equal to that of the fixing ring.

Each locking tab advantageously includes a tooth capable of latching into a corresponding recess in the wall of the reserve container.

The upright of at least one fixing arm is preferably capable of engaging in a throat formed on the wall of the reserve container, within the latter, further improving the retention of the fixing ring on the reserve container.

The supporting skirt preferably includes a plurality of, preferably three, longitudinal ribs projecting inwards.

Such ribs enable the area of contact between the fuel pump and the supporting skirt to be limited and thus allow the transmission of the vibrations of the fuel pump to the reservoir to be reduced further.

The supporting skirt is preferably extended downwards by a bearing leg, which serves as a bottom stop for the fuel pump.

At least one and preferably each elastically deformable branch preferably extends substantially in a plane containing the axis of the retention member.

At least one and preferably each elastically deformable branch likewise preferably includes one and preferably two points of inflection.

Thanks to the presence of at least one point of inflection and preferably of two points of inflection, the retention member offers vibration damping performance which may prove to be better than those obtained by means of branches which do not have a point of inflection.

In a particular embodiment, at least one and preferably each branch includes two substantially rectilinear portions, one of which is longer than the other, for example substantially twice the length of the other.

In a preferred embodiment, the branches are alternately connected to the upper and lower axial ends of the supporting skirt and of the fixing ring.

Such an alternating arrangement proves to be advantageous to a good retention of the supporting skirt whilst effectively damping the vibrations of the fuel pump, both axially and transversely.

In a preferred embodiment, the branches are connected to the supporting skirt and to the fixing ring substantially perpendicularly to the axis of these elements.

When the retention member is viewed from the side, that is to say in a direction perpendicular to the axis of the supporting skirt and of the fixing ring, the axial ends of the fixing ring are preferably situated between the axial ends of the supporting skirt.

In a particular embodiment, the reservoir includes a deflector for the purpose of directing the fuel emerging from the suction duct into the reserve container.

A deflector of this kind is particularly useful when the jet pump is delivering a high fuel flow rate and the fuel is tending to be injected vertically from the suction duct.

The deflector then makes it possible to divert this flow of fuel in a direction chosen in such a way that it falls back into the reserve container.

The deflector is preferably made in one piece with the retention member.

In particular, the deflector can be supported by the fixing ring.

The deflector preferably extends above the nose forming a spout.

In a particular embodiment, the deflector can include an inward-curved part open towards the inside of the reserve container and connected to the fixing ring by two substantially parallel walls.

If there is an elbow or a tube at the upper end of the suction duct, the abovementioned deflector is no longer necessary.

The reserve container is preferably made in one piece with the bottom wall of the reservoir.

It is thus possible to obtain improved leaktightness and to avoid any problems with fixing or holding the reserve container relative to the reservoir.

In other words, the fixing of the reserve container on the reservoir is particularly reliable and simple when the reserve container is secured to the bottom wall of the reservoir by being moulded from the same material as this bottom wall.

The wall of the reserve container can be made in one piece with partitions extending outside the reserve container and connected to the bottom wall of the reservoir.

Such partitions can form obstacles to the waves of fuel in the reservoir and contribute to improving its mechanical behaviour.

The reservoir advantageously includes a housing for a fuel filter on the outside of the reserve container, this housing preferably being formed in one piece by moulding with the bottom wall of the reservoir.

The reserve container preferably has a re-entrant angle, which defines a space that at least partially accommodates the suction duct.

The said duct can then be positioned close to the reserve container inside the reservoir, making it easier to supply the reserve container with fuel from the suction duct.

The reservoir preferably includes two assembled half-shells.

The elements which it is necessary to arrange within the reservoir can then be put in place before the two half-shells are assembled, and the reservoir can be made without an opening of large dimensions made through its wall, which would tend to make it more difficult to make the reservoir comply with standards relating to hydrocarbon emissions.

The reservoir preferably includes a filler nozzle ending above the reserve container, which makes it possible to fill the reserve container with a small quantity of fuel since all the fuel introduced into the filler nozzle starts by filling the reserve container before filling the rest of the reservoir.

The invention also relates to any one of the constituent elements of the reservoir defined above when considered in isolation.

Thus, in particular, the invention relates to a reserve container, characterized in that it is made in one piece with the bottom wall of the reservoir.

The invention also relates to the member for retaining the fuel pump as defined above.

The invention also relates to a housing for a fuel filter, characterized in that it is made in one piece with the bottom wall of the reservoir.

The invention also relates to a jet pump as defined above and the support for a pressure regulator as defined above.

Figure 2:
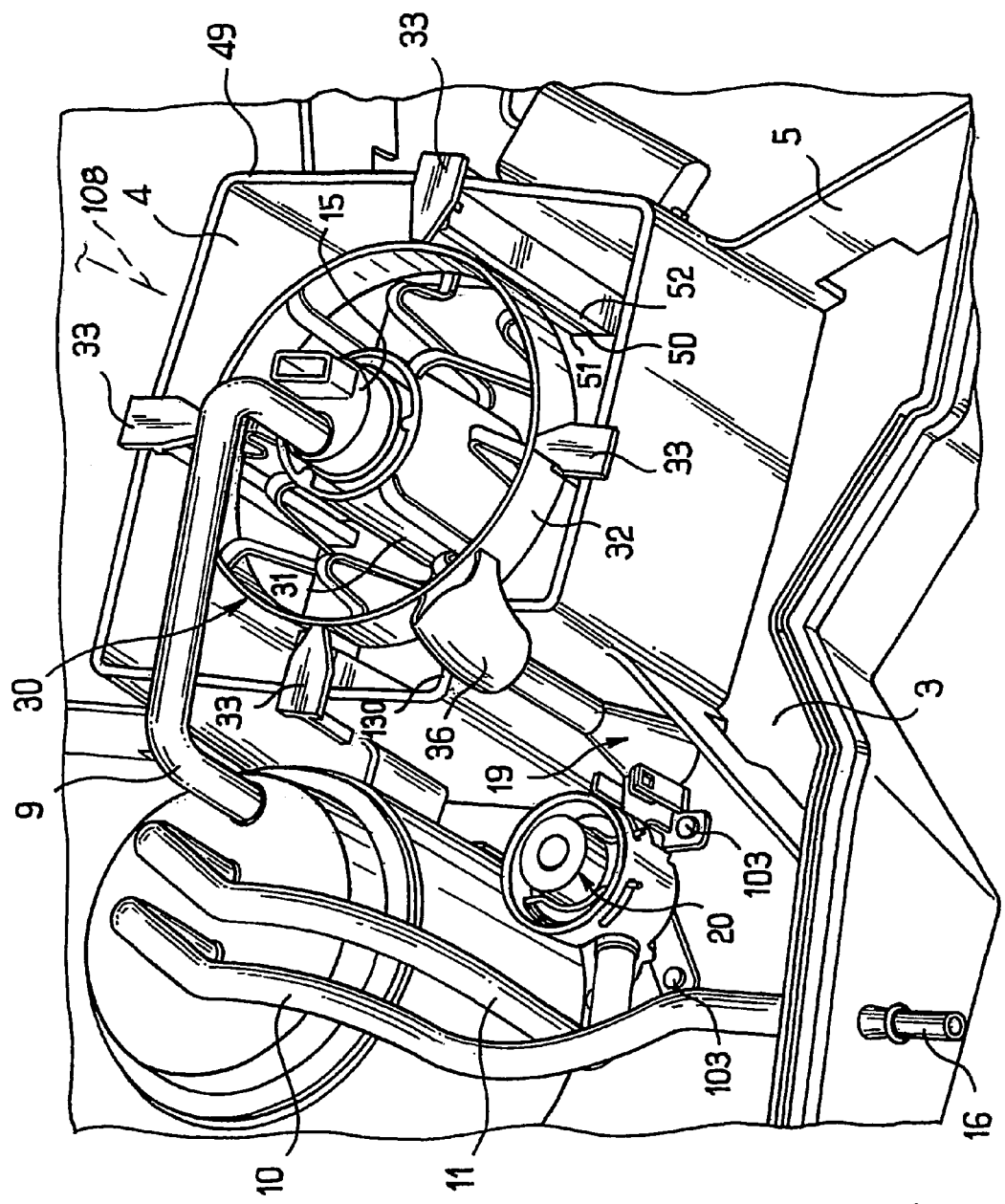
Figure 3A:
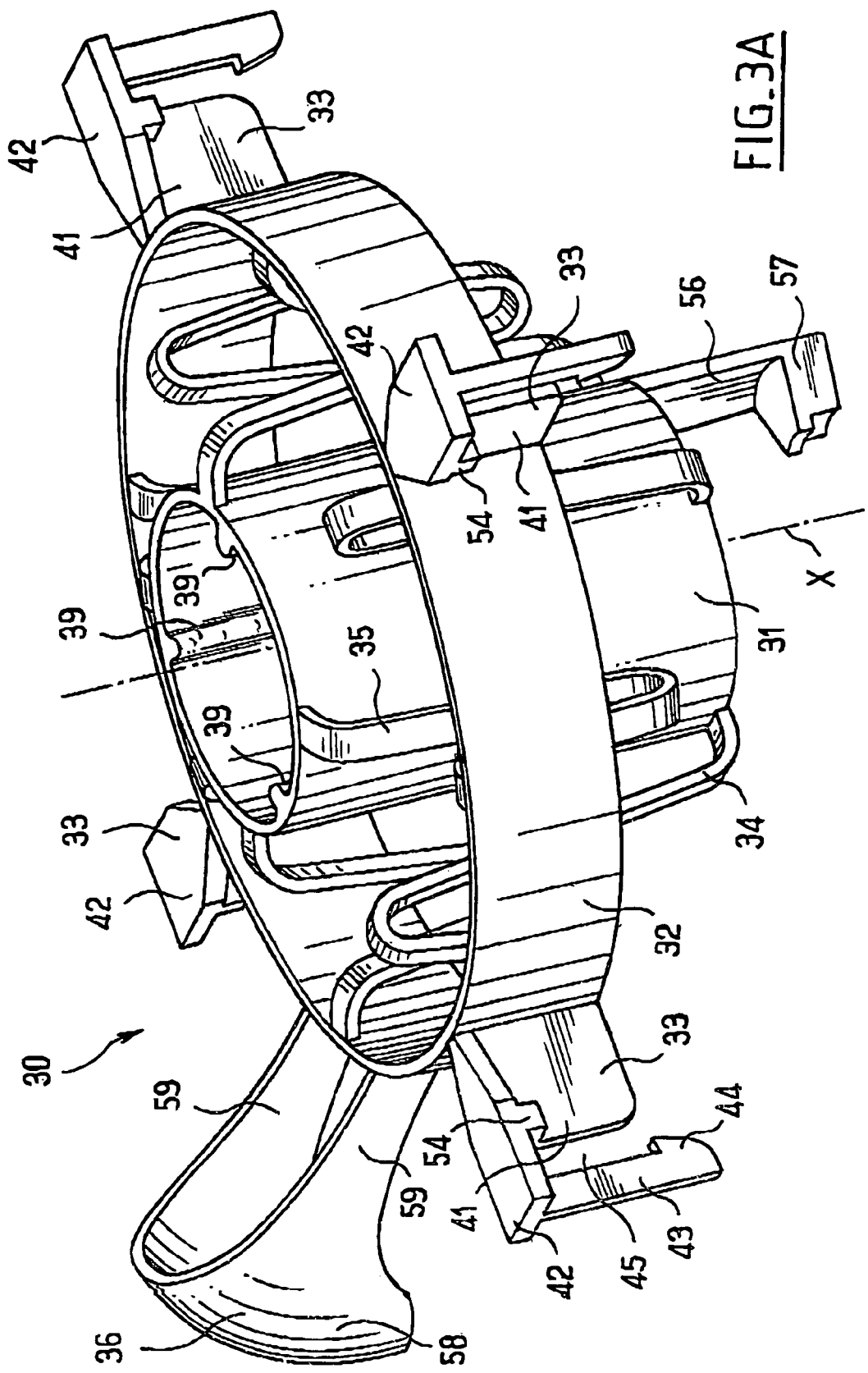
Figure 3B:
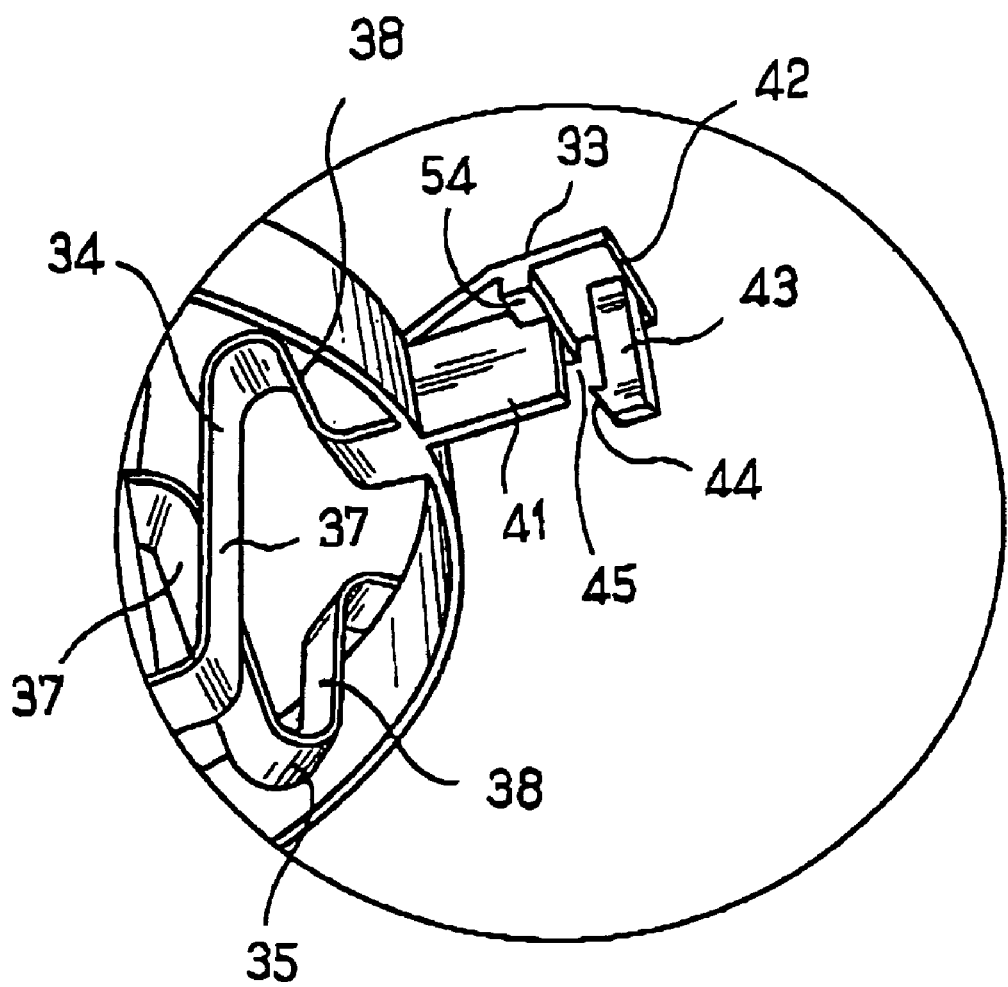
Figure 4:
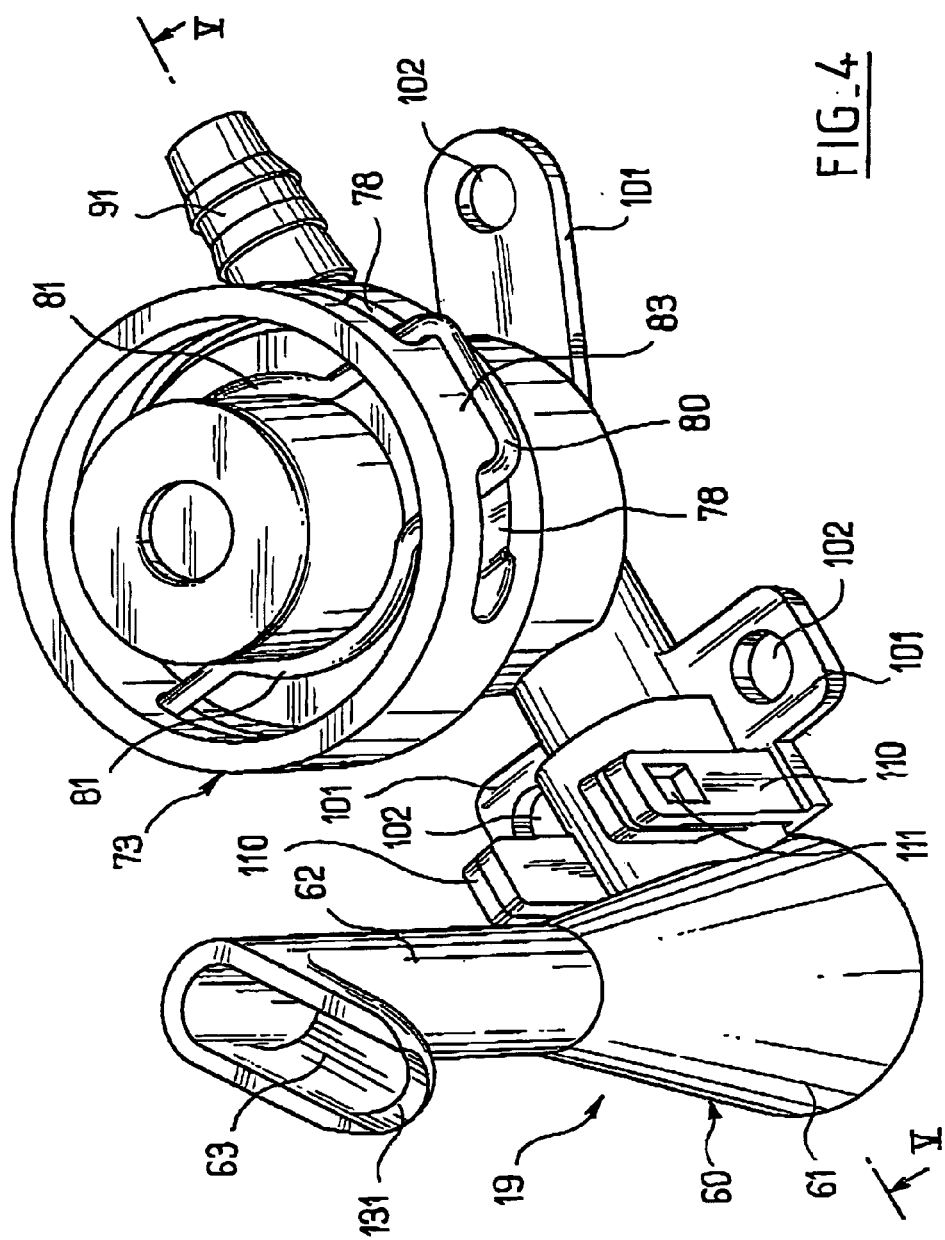
Figure 5:
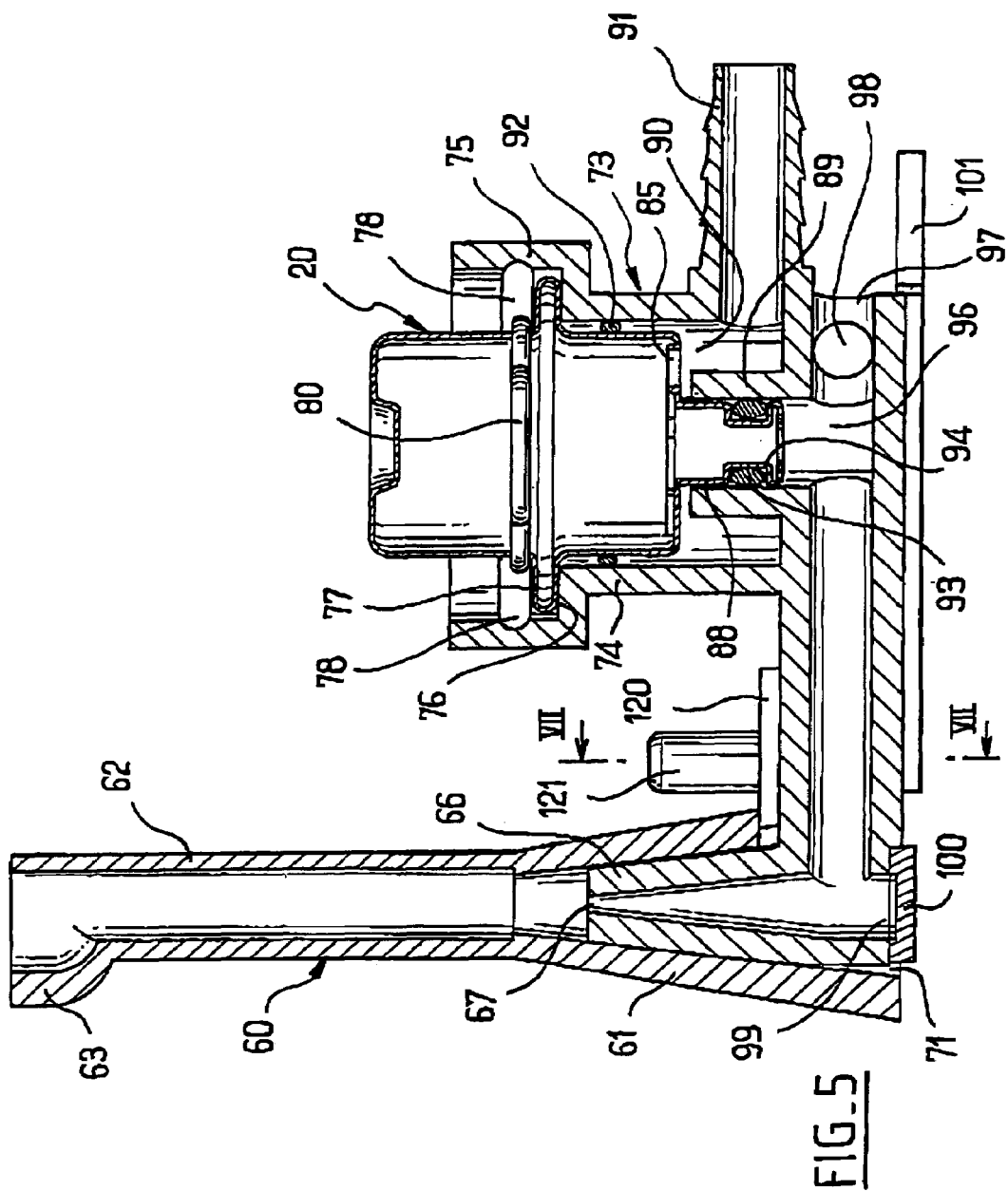
Figure 6:
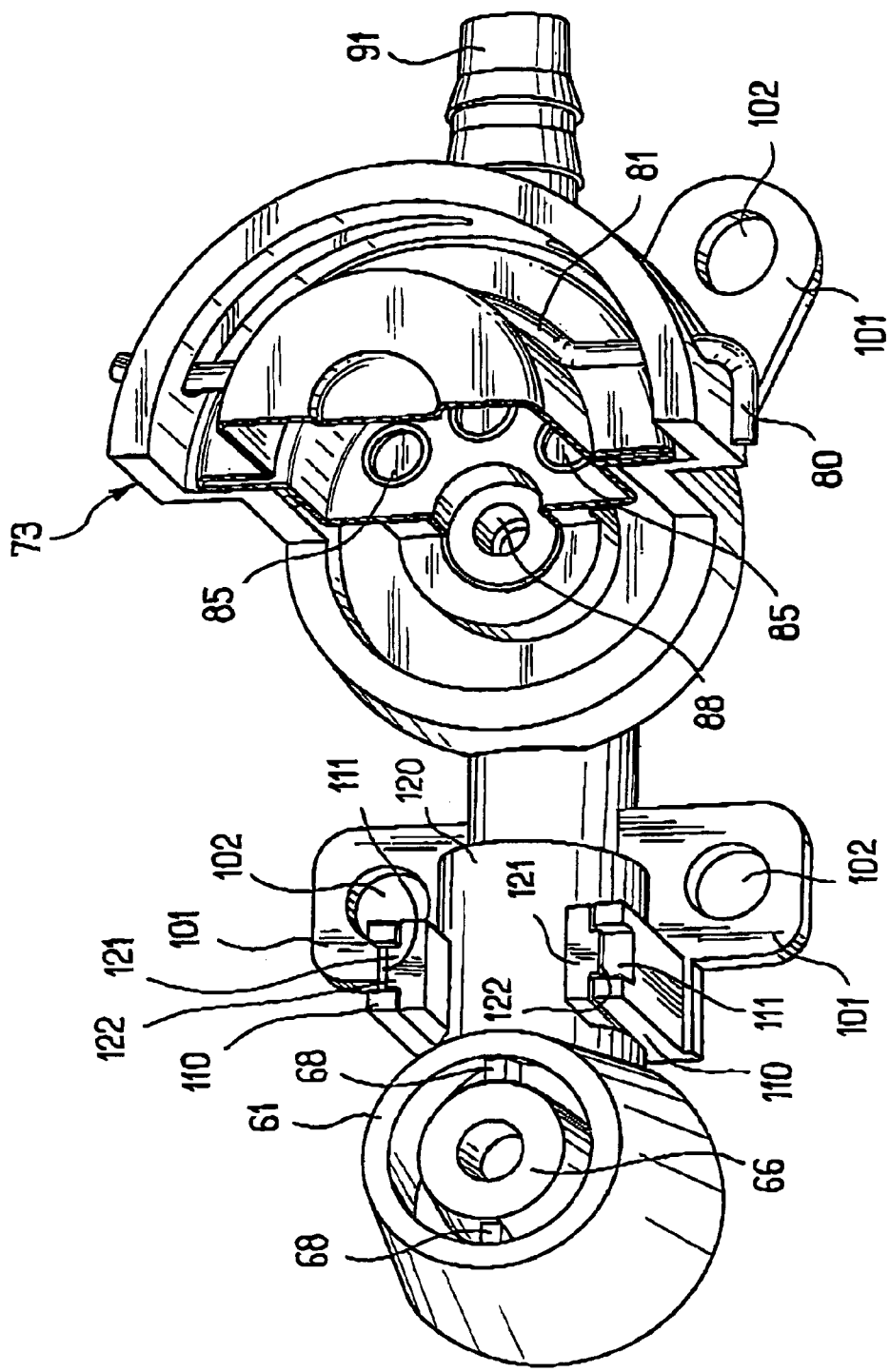

The invention will be better understood by reading the detailed description which follows of exemplary embodiments, which do not restrict the invention, and by examining the attached drawings, in which:

FIG. 1 is a schematic perspective view of a half-shell of a fuel reservoir corresponding to one exemplary embodiment of the invention, FIG. 2 is a view, on an enlarged scale, of a detail of FIG. 1, which shows the reserve container more clearly, FIG. 3A is a schematic perspective view representing the retention member for the fuel pump in isolation, FIG. 3B represents a detail of the retention member, FIG. 4 is a schematic perspective view of the jet is pump and the support of the pressure regulator, FIG. 5 is a section in a centre plane of the jet pump and the support of the pressure regulator shown in FIG. 4, FIG. 6 is a schematic perspective view, including a partial section of the jet pump and of the support of the pressure regulator shown in FIG. 4, FIG. 7 is a section along the line VII-VII in FIG. 5, and FIG. 8 is a schematic side view of a jet pump and of a pressure regulator according to a variant embodiment of the invention.

FIG. 1 shows a fuel reservoir (1) comprising a lower half-shell (2) and an upper half-shell (not shown) assembled one against the other at the periphery.

The lower half-shell (2) defines the bottom wall (3) of the reservoir and supports various elements of the fuel supply system of the motor vehicle.

In particular, as can be seen more clearly in FIG. 2, the bottom wall (3) supports a reserve container (4) and a set of ribs (5) intended to limit the amplitude of the waves of fuel in the reservoir and to stiffen the latter.

The bottom wall (3) likewise supports a wall (7) which is a cylinder of revolution, defining a housing for receiving a fuel filter.

This housing is closed at the top by a cover (8) comprising nozzles, to which respective tubes (9, 10 and 11) are connected.

Tube (9) connects the fuel filter to a fuel pump (15) intended to draw fuel from the bottom of the reserve container (4).

Tube (10) is connected to a nozzle (16) which allows an external tube connected to the vehicle's engine to be connected to the reservoir.

The excess fuel not drawn in by the vehicle's engine is directed towards a jet pump (19) via tube (11) and a pressure regulator (20).

A fuel gauge (21) is fixed on the half-shell (2). The fuel pump (15) is held within the reserve container (4) by means of a retention member (30), which has been shown separately in FIGS. 3A and 3B.

This retention member (30) includes a supporting skirt (31), in which are fixed the fuel pump (15) and a fixing ring (32) provided, in the example described, with four arms (33) used for fixing on the reserve container (4).

The supporting skirt (31) is connected to the fixing ring (32) by branches (34 and 35), the shape of which is chosen so as to reduce the transmission of vibrations from the fuel pump to the reservoir.

In the exemplary embodiment described, the supporting skirt (31) includes three internal ribs (39) extending over its full height and distributed at regular angular intervals around its axis X.

These ribs (39) make it possible to reduce the area of contact between the fuel pump (15) and the supporting skirt (31), helping to limit the transmission of vibrations from the fuel pump to the reservoir.

Each branch (34 or 35) includes two substantially rectilinear parts (37 and 38), one of which has a length substantially twice that of the other, each of these substantially rectilinear parts (37 or 38) having a point of inflection.

The substantially rectilinear portion (37) is connected by an elbow perpendicularly to the supporting skirt (31) and the substantially rectilinear portion (38) is connected by an elbow perpendicularly to the fixing ring (32), as can be seen in particular in FIG. 3B.

The substantially rectilinear portions (37 and 38) are connected to one another by a substantially U-shaped portion, which is upwardly concave for the branches (35) and downwardly concave for the branches (34).

Moreover, the substantially rectilinear portions (37) of the branches (34 and 35) are alternately connected to the upper and lower end of the supporting skirt (31), and the substantially rectilinear portions (38) of the branches (34 and 35) are alternately connected to the upper and lower end of the fixing ring (32).

As can be seen in FIGS. 3A and 3B, each fixing arm (33) includes a substantially vertical upright (41), which extends in a plane containing the axis X and which is connected at one side over substantially the entire height of the fixing ring (32).

At the top, each fixing arm (33) includes a substantially horizontal supporting wall (42), to the lower face of which the abovementioned upright (41) and a locking tab (43) are connected, the latter being provided with a tooth (44).

The locking tab (43) and the upright (41) form between them a throat (45) in which the wall of the reserve container (4) can engage, as can be seen in FIG. 2.

The teeth (44) then enter into engagement with recesses, not visible in FIG. 2, in the wall of the reserve container (4).

When the retention member (30) is in place, the upper end section (49) of the reserve container (4) rests against the lower face of the supporting walls (42).

As can be seen in FIG. 2, the reserve container (4) has grooves (50) formed between parallel ribs (51 and 52) on its inner surface.

These ribs (51 and 52) are arranged in such a way that each upright (41) of a fixing arm (33) enters into engagement with the corresponding groove (50).

The supporting walls (42) furthermore include a transverse rib (54) on the lower face at the corner of the upright (41) adjacent to the throat (45).

This rib (54) comes to rest on the ribs (51 and 52) when the retention member (30) is in place on the reserve container (4).

The retention member (30) furthermore includes a leg (56) for supporting the fuel pump (15), this supporting leg

(56) having at its lower end an inward-pointing elbow (57), against which the fuel pump (15) comes to rest axially.

Finally, the retention member (30) includes a deflector (36), the function of which will be explained in greater detail below.

This deflector (36) includes an inward-curved part (58) connected to the fixing ring (32) by two parallel branches (59).

The jet pump (19) has been shown in FIGS. 4 to 7.

This pump includes a suction duct (60), including a frustoconical base (61) surmounted by a substantially vertical conduit (62), the latter being provided at the end, in the example described, with a nose (63) forming a spout, the function of which will be described in greater detail below.

The frustoconical base (61) receives an ejection nozzle (66) provided with an upward-pointing ejection orifice (67), which enables fuel to be ejected at a relatively high speed into the conduit (62).

The ejection nozzle (66) is fixed within the frustoconical base (60), in particular by means of two diametrically opposite ribs (68) which project within the frustoconical base (61), as can be seen in FIG. 6.

These ribs (68) make it possible to ensure the existence of a space for the flow of the fuel between the ejection nozzle (66) and the frustoconical base (61), this space opening into the lower end (71) of the suction duct (60) close to the bottom wall (3) of the reservoir.

The ejection nozzle (66) is embodied with a conical shape that converges towards the top in such a way as to accelerate the fuel.

In the example described, the ejection nozzle (66) is embodied in one piece with a support (73), in which the pressure regulator (20) is mounted, the latter being shown only in part for the sake of the clarity of the drawing.

The support (73) has a tubular body (74), the upper part (75) of which is enlarged, this body (74) defining a housing for the purpose of receiving the pressure regulator (20).

With the lower part of the body (74), the upper part (75) forms a shoulder (76), against which a collar (77) of the pressure regulator (20) can be supported.

The upper part (75) is traversed by lateral slots (78), which allow a retention clip (80) of the pressure regulator (20) to be mounted in the body (74).

This clip (80) has two branches (81) capable of engaging on the pressure regulator (20) above the collar (77).

The branches (81) of the clip (80) likewise clasp a bridge of material (83) extending between the slots (78).

As can be seen more particularly in FIG. 6, the pressure regulator (20) includes a plurality of admission orifices (85) formed around a downward-pointing outlet conduit (88).

The outlet conduit (88) is received in an interior skirt (89) of the support (73), this interior skirt (89) forming with the body (74) an annular space (90) communicating with a nozzle (91) used for connection of the tube (11).

The admission orifices (85) open into the annular chamber (90).

An O-ring seal (92) ensures the leaktightness of the mounting of the pressure regulator (20) in the body (74), while the O-ring seal (93), housed in a throat (94) of the outlet conduit (88) ensures the leaktightness of the mounting of the latter in the interior skirt (89).

At the lower end, the interior skirt (89) opens into a conduit (96) communicating with the ejection nozzle (66).

To facilitate the moulding of the support (73), the conduit (96) opens to the outside, on the opposite side from the ejection nozzle (66), via an orifice (97), which is plugged by a ball (98) after the production of the support (73).

Also for reasons of ease of moulding, the ejection nozzle (66) opens to the outside, on the opposite side from the orifice (67), via an orifice (99), which is plugged by an added element (100) after production of the ejection nozzle (66).

The support (73) includes fixing tabs (101), each provided with an orifice (102) that allows them to receive a stud (103) formed in one piece with the bottom wall (3) of the reservoir.

After its insertion into the hole (102), each stud (103) is upset to keep the support (73) on the lower half-shell (2), as can be seen in FIG. 2.

At the level of the end of the conduit (96) which is connected to the ejection nozzle (66), the support (73) has two tabs (110) intended for fixing the suction duct (60).

These two tabs (110) are substantially vertical and parallel and, in the vicinity of their upper end, each has a recess (111).

The suction duct (60) includes a substantially semi-cylindrical lateral extension (120), which is open downwards, as can be seen in FIG. 7 and is designed to overlap the conduit (96).

The lateral extension (120) supports two substantially parallel and vertical locking tabs (121), provided on the outside with teeth (122) arranged to latch into the recesses (111) of the tabs (110).

It will be noticed in FIG. 7 that the spacing between the tabs (110) and the conduit (96) corresponds substantially to the thickness of an upright of the lateral extension (120) in such a way that the suction duct (60) can be fixed on the support (73) with a reduced mounting play.

The reserve container (4) includes a re-entrant angle (130), which defines a space that enables the suction duct (60) to be at least partially accommodated, as can be seen in FIG. 2.

The deflector (36) can thus assume a position above the nose forming a spout (63).

At its free end (131), the latter has a recess which allows the fuel flowing out via the conduit (62) to fall into the reserve container (4) in the case of a low flow rate.

During the operation of the fuel pump, the fuel not used by the engine of the vehicle is returned to the reserve container (4) after passing through the pressure regulator (20) and the jet pump (19).

The ejection nozzle (66) projects the fuel coming from the tube (11) upwards in the conduit (62) at a relatively high velocity, creating a reduced pressure at the lower end (71) of the frustoconical base (61) by a Venturi effect in such a way that fuel outside the reserve container (4) is sucked into the suction duct (60).

When the flow rate of fuel flowing via the conduit (62) is high, the deflector (36) deflects the flow of fuel in the direction of the fuel pump (15) in such a way as to allow it to fall back into the reserve container (4).

When the flow rate of fuel in the conduit (102) is low, the deflector (36) is not effective or not very effective and it is essentially the nose (63) which allows the fuel to fall into the reserve container (4).

The reserve container (4) is preferably in line with an end 108 by which a filler nozzle (only partially shown schematically) of the reservoir opens into the latter, ensuring that the reserve container (4) is filled first.

The various elements of the fuel reservoir which have just been described can be made of any material compatible with the fuel in the reservoir.

To make the retention member (30), it is possible to use polyacetal, polyamide or high-density polyethylene, this list not being exhaustive.

The number of branches (34 and 35) and their width and shape will be chosen as a function of the vibration frequencies of the fuel pump (15).

The half-shells of the fuel reservoir can be made by any material shaping process, in particular by injection moulding, rotational moulding or blow moulding.

The two half-shells of the fuel reservoir can be made of high-density polyethylene, for example.

Of course, the invention is not limuted to the exemplary embodiment which has just been described.

In particular, it is possible to modify the manner in which the jet pump is arranged or the manner in which the fuel pump is held in place in the reserve container.

In a first variant, which is not illustrated, the nose forming a spout and the deflector are replaced by an elbow in the upper part of the suction duct, this elbow opening above the reserve container.

FIG. 8 shows a jet pump (19') corresponding to a variant embodiment of the invention.

The jet pump (19') includes a suction duct (140) having a constriction (141) about half-way up.

In examining FIG. 8, it will be noted that the cross section of the duct portion (140*a*) below the constriction (141) is larger than the cross section of the duct portion (140*b*) above the constriction (141).

The duct (140) includes four external stiffening ribs (142) arranged at the level of the constriction (141).

At its upper end, the duct (140) is connected to a tube (145) passing over the wall of the reserve container (4) in such a way that the fuel emerging from the tube portion (145) falls directly into the reserve container (4).

In the example described, the end (147) of the tube (146) via which the fuel emerges is lower than the upper edge of the wall of the reserve container (4).

As a variant, the end (147) can be higher than the upper edge of the wall of the reserve container (4).

The invention claimed is:

1. A motor-vehicle fuel reservoir defining a volume for holding a fuel which is used by an engine comprising:
   - a reserve container which is located in the volume and which defines a reserve volume;
   - a fuel pump located in said reserve container which pumps a pumped amount of fuel from the fuel located in the reserve volume of the reserve container, which pumped amount is in excess of a required amount of fuel required for delivery to the engine so that there is an excess amount of fuel pumped by the fuel pump;
   - a pressure regulator located in the volume and outside of the reserve volume;
   - a fuel filter located in the volume and housed in a housing which is outside of the reserve volume of the reserve container, said fuel filter including three discrete tubes, namely
      - a filter delivery tube by which the pumped amount of fuel pumped by said fuel pump is delivered directly to the fuel filter for filtering,
      - an engine delivery tube by which the required amount of the pumped amount of fuel filtered by the fuel filter is delivered directly to the engine, and
      - a regulator delivery tube by which the excess amount of the pumped amount of fuel filtered by the fuel filter is delivered directly to the pressure regulator; and
   - a suction jet pump which is located in the volume and outside of the reserve volume, and which is operated with the excess amount of fuel coming directly from the pressure regulator and previously from the fuel filter, the suction jet pump
      a) sucking in fuel from at least one low suction point which low suction point is located outside of the reserve container and
      b) delivering the sucked in fuel to the reserve container together with the excess amount of fuel at at least one high delivery point situated above a desired minimum level of fuel in the reserve container and higher than the low suction point.

2. A reservoir according to claim 1, wherein the reserve container includes a wall defining a reserve volume opening at the top via an opening into the volume of the reservoir and in that the suction jet pump delivers the fuel into the reserve container via this reserve opening.

3. A reservoir according to claim 1, wherein the jet pump includes a substantially vertical suction duct.

4. A reservoir according to claim 1, wherein, at an upper end, the suction duct includes a nose forming a spout arranged to allow the fuel flowing within the nose to pour into the reserve container.

5. A reservoir according to claim 3, further including a deflector to direct the fuel emerging from the suction duct towards the reserve container.

6. A reservoir according to preceding claim 1, wherein the reserve container is made in one piece with the bottom wall of the reservoir.

7. A reservoir according to claim 1, further including two assembled half-shells which define the volume.

8. A reservoir according to claim 1, further including a filler nozzle for the volume which has an ending located directly above the open top portion of the reserve container such that fuel exiting the ending is directed to the open top portion assuring that the fuel first fills the reserve container before filling a remainder of the volume.

9. A reservoir according to claim 3, wherein the substantially vertical suction duct extends substantially over the full height of the reserve container.

10. A reservoir according to claim 8, wherein the reserve container has a leak-tight bottom and an open top portion, said leak-tight bottom having no valves therein which might leak.

* * * * *